United States Patent
Jiang et al.

(10) Patent No.: US 11,539,431 B1
(45) Date of Patent: Dec. 27, 2022

(54) SYSTEMS AND METHODS FOR OPTICAL FILTER FAULT LOCALIZATION

(71) Applicant: HUAWEI TECHNOLOGIES CO., LTD., Guangdong (CN)

(72) Inventors: Zhiping Jiang, Kanata (CA); Junho Chang, Kanata (CA); Choloong Hahn, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/577,488

(22) Filed: Jan. 18, 2022

(51) Int. Cl.
*H04B 10/079* (2013.01)

(52) U.S. Cl.
CPC ..... *H04B 10/0791* (2013.01); *H04B 10/0799* (2013.01); *H04B 10/07953* (2013.01); *H04B 10/07955* (2013.01)

(58) Field of Classification Search
None
See application file for complete search history.

(56) References Cited

U.S. PATENT DOCUMENTS

| | | | | |
|---|---|---|---|---|
| 2002/0044322 A1* | 4/2002 | Blumenthal | ........... | H04B 10/00 398/147 |
| 2006/0216038 A1* | 9/2006 | Yokota | ............. | H04B 10/07953 398/177 |
| 2012/0182023 A1* | 7/2012 | Zhang | ................ | G01M 11/3109 324/501 |
| 2018/0267266 A1* | 9/2018 | Yilmaz | ............... | G02B 6/29395 |
| 2018/0269964 A1* | 9/2018 | Mertz | ................ | G02B 6/29395 |
| 2019/0296851 A1* | 9/2019 | Jiang | ................ | H04B 10/07953 |
| 2019/0305845 A1* | 10/2019 | Cyr | .................. | H04B 10/07953 |

* cited by examiner

*Primary Examiner* — David W Lambert
(74) *Attorney, Agent, or Firm* — BCF LLP

(57) ABSTRACT

The disclosed systems and methods for optical filter fault localization. The optical filter fault localization is based on: i) determining an accumulated noise density at frequencies where ASE noise is filtered out by a faulty optical filter in an optical signal; ii) comparing the accumulated noise density with predicted accumulated noise densities, the predicted accumulated noise densities representing noises predicted from a plurality of optical filters to a receiver; and iii) determining, based on the comparison of the accumulated noise density and the predicted accumulated noise densities, a location of the faulty optical filter.

18 Claims, 10 Drawing Sheets

SYSTEMS AND METHODS FOR OPTICAL FILTER FAULT LOCALIZATION

CROSS-REFERENCE TO RELATED APPLICATIONS

This is the first application filed for the instantly disclosed technology.

TECHNICAL FIELD

The present disclosure generally relates to optical communications and, in particular, to systems and methods for optical filter fault localization.

BACKGROUND

In the field of optical communication, typically an optical light path consists of multiple transmission fiber spans which includes optical amplifiers to compensate propagation losses due to transmission fibers and other components. Also, the optical light path consists of multiple wavelength selective switches (WSS) to route wavelength channels. The WSS acts as an optical filter. The WSS based optical filter might have two types of impairments. The first impairment is a spectrum narrowing and the other impairment is the central wavelength shift resulting in an offset in the spectrum. The detection or identification of spectrum narrowing and/or offset in the spectrum is relatively straightforward in the receiver digital signal processing (DSP), however the localization of the faulty filter is difficult unless there exist a number of optical spectrum analyzers (OSAs) in many different places of the transmission link.

To this end, there is an interest in developing a simple and efficient system and method for optical filter fault localization.

SUMMARY

The embodiments of the present disclosure have been developed based on developers' appreciation of the limitations associated with the prior art, namely localization of a faulty filter in an dense wavelength-division multiplexing (DWDM) optical link based on a number of optical spectrum analyzers (OSAs) in many different places of the DWDM optical link.

Developers of the present technology have devised methods for optical filter fault localization. In various non-limiting embodiments, as a wavelength channel propagates from a transmitter towards a receiver in a DWDM optical link, amplified spontaneous emission (ASE) noise from each optical amplifier between the transmitter and the receiver may be added to the wavelength channel. Also, during the propagation of the wavelength channel over the DWDM link, the wavelength channel may pass through one or more WSS. In the case that one of the WSSs becomes faulty, the ASE noise accumulated up to a location of the faulty WSS may be filtered out asymmetrically. At the frequencies where the ASE noise is filtered out by the faulty WSS, an additional ASE noise may start to reaccumulate from nearly zero level due to remaining amplifiers after the faulty WSS. The accumulated noise density may be directly related to the location of the faulty WSS.

In various non-limiting embodiments, a link controller including one or processor may determine the accumulated noise density. Further, the link controller may predict accumulated noise densities from various WSSs to the receiver in the DWDM link. The link controller may compare the accumulated noise density with the predicted accumulated noise densities to identify the location of faulty WSS.

In accordance with a first broad aspect of the present disclosure, there is provided a method for optical filter fault localization comprising: determining an accumulated noise density at frequencies where amplified spontaneous emission (ASE) noise is filtered out by a faulty optical filter in an optical signal; comparing the accumulated noise density with predicted accumulated noise densities, the predicted accumulated noise densities representing noises predicted from a plurality of optical filters to a receiver; and determining, based on the comparison of the accumulated noise density and the predicted accumulated noise densities, a location of the faulty optical filter.

In accordance with any embodiments of the present disclosure, the predicted accumulated noise densities from the plurality of optical filters to the receiver along with locations of the plurality of optical filters are stored in a non-transitory memory element.

In accordance with any embodiments of the present disclosure, the predicted accumulated noise densities are predetermined based on link parameters on a path between a transmitter and the receiver over which the optical signal is propagating.

In accordance with any embodiments of the present disclosure, the predicted accumulated noise densities are predetermined from each optical filter of the plurality of optical filters to the receiver, each optical filter being located on a path between a transmitter and the receiver over which the optical signal is propagating.

In accordance with any embodiments of the present disclosure, the method comprising determining a location of a given optical filter in response to the accumulated noise density being approximately equal to a predicted accumulated noise density corresponding to the given optical filter.

In accordance with any embodiments of the present disclosure, the method comprising determining that a given optical filter of the plurality of optical filters is the faulty optical filter in response to the accumulated noise density being approximately equal to the predicted accumulated noise density corresponding to the given optical filter.

In accordance with any embodiments of the present disclosure, the accumulated noise density is determined based on a pilot tone signal inserted in the optical signal.

In accordance with any embodiments of the present disclosure, the accumulated noise density is determined based on a correlation between a recovered optical signal and the optical signal.

In accordance with any embodiments of the present disclosure, the accumulated noise density is determined based on a correlation between at least two spectral slices spaced apart by a distance equals to a baud rate.

In accordance with a second broad aspect of the present disclosure, there is provided a system for optical filter fault localization comprising: a non-transitory memory element having instructions thereon; a processor coupled to the non-transitory memory element to execute the instructions to cause the processor to: determine an accumulated noise density at frequencies where amplified spontaneous emission (ASE) noise is filtered out by a faulty optical filter in an optical signal; compare the accumulated noise density with predicted accumulated noise densities, the predicted accumulated noise densities representing noises predicted from a plurality of optical filters to a receiver; and determine, based on the comparison of the accumulated noise density and the predicted accumulated noise densities, a location of the faulty optical filter.

In accordance with any embodiments of the present disclosure, the processor is further configured to determine a location of a given optical filter in response to the accumulated noise density being approximately equal to a predicted accumulated noise density corresponding to the given optical filter.

In accordance with any embodiments of the present disclosure, the processor is further configured to determine that a given optical filter of the plurality of optical filters is the faulty optical filter in response to the accumulated noise density being approximately equal to the predicted accumulated noise density corresponding to the given optical filter.

BRIEF DESCRIPTION OF THE FIGURES

Further features and advantages of the present disclosure will become apparent from the following detailed description, taken in combination with the appended drawings, in which.

Figure 1:
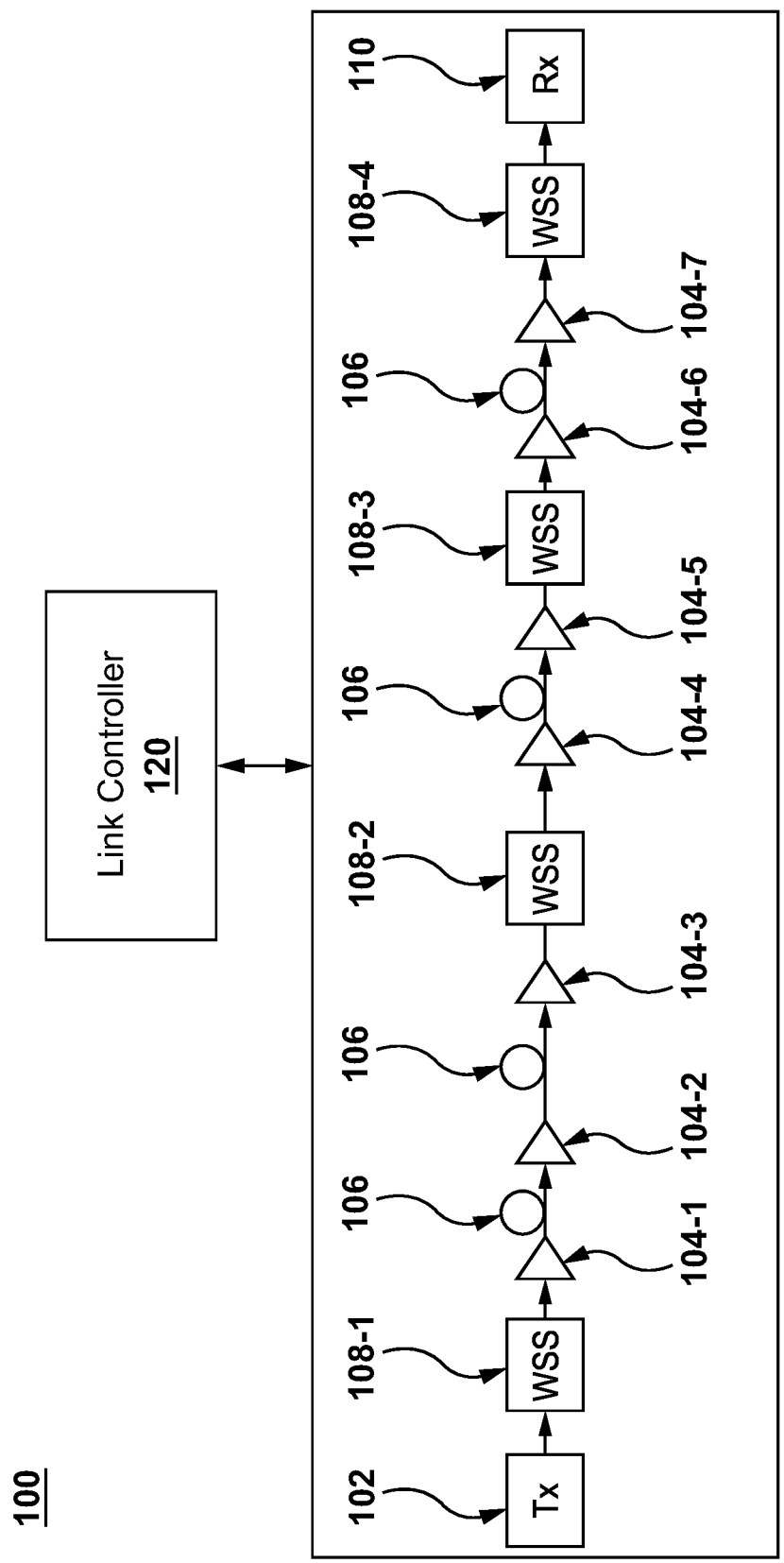
FIG. 1 illustrates a dense wavelength division multiplexing (DWDM) optical link, in accordance with various non-limiting embodiments of the present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and a method for optical filter fault localization.

Unless otherwise defined or indicated by context, all technical and scientific terms used herein have the same meaning as commonly understood by one of ordinary skill in the art to which the described embodiments appertain to.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the processor, nor is their use (by itself) intended to imply that any "second processor" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the context of the present disclosure, the expression "data" includes data of any nature or kind whatsoever capable of being stored in a database. Thus, data includes, but is not limited to, audiovisual works (images, movies, sound records, presentations etc.), data (location data, numerical data, etc.), text (opinions, comments, questions, messages, etc.), documents, spreadsheets, etc.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes a system and a method for optical filter fault localization.

FIG. 1 illustrates a dense wavelength-division multiplexing (DWDM) optical link 100, in accordance with various non-limiting embodiments of the present disclosure. As shown, the DWDM link 100 may include a transmitter 102, optical amplifiers 104-1, 104-2, . . . 104-7, optical fibers 106, wavelength selective switches (WSSs) 108-1, 108-2, . . . 108-4, a receiver 110, and a link controller 120. The DWDM optical link 100 may include other components. However, such components have not been illustrated for the purpose of simplicity.

The transmitter 102 may generate optical signals (wavelength channels) to be transmitted over the optical fibers 106. It is to be noted that the terms optical signals and wavelength channels may be used interchangeably in the present disclosure. The optical amplifiers 104-1, 104-2, . . . 104-7 may be located along the optical fibers 106. The optical amplifiers 104-1, 104-2, . . . 104-7 may be used to compensate the loss from the optical fibers 16 and the associated components.

The WSSs 108-1, 108-2, . . . 108-4 may be used to drop and/or add wavelength channels, and route wavelength channels. In certain non-limiting embodiments, the WSSs 108-1, 108-2, . . . 108-4 may act as optical filters.

In certain non-limiting embodiments, the link controller 120 may communicate with other components of the DWDM link 100 such as the transmitter 102, the optical amplifiers 104-1, 104-2, . . . 104-7, the WSSs 108-1, 108-2, . . . 108-4, the receiver 110 or the like. The link controller 120 may control functionalities of various components of the DWDM link 100 and may have access to a link topology of the DWDM link 100. Also, the link controller 120 may have access to the various link parameters (e.g., WSS location, span loss, amplifier gain, amplifier noise figure, input power to amplifier or the like). It is to be noted that where in the DWDM link 100, the link controller 120 is located should not be limit the scope of present disclosure.

It is to be noted that the WSS based optical filters might have two types of filtering impairments. The first filtering impairment may be a spectrum narrowing of the wavelength channels and the other filtering impairment may be the central wavelength shift of the wavelength channels resulting in an offset in the spectrum.

Among the two types of filtering impairments mentioned above, the spectrum narrowing usually does not change over time due to the fact that it is often relevant to filter cascading or slight misalignment between different filters. However, the central wavelength shift (i.e., offset in the spectrum) may occur abruptly by a single filter (e.g., anyone of the WSSs 108-1, 108-2, . . . 108-4) with a significant defect or damage. By way of example, a leakage of the hermetic-packaged WSS (e.g., WSSs 108-1, 108-2, . . . 108-4) may change an internal air temperature, pressure, and/or humidity, and may cause abnormal operation of key components inside WSS (e.g., WSSs 108-1, 108-2, . . . 108-4).

Any change of such parameters may impact on the output light angle of diffraction devices and microelectromechanical systems (MEMS) mirrors and may directly translate into center wavelength shift of the WSS (e.g., WSSs 108-1, 108-2, . . . 108-4). Although such faults may not happen frequently, however, once such faults happen, it may be extremely difficult to localize the faulty WSS (e.g., WSSs 108-1, 108-2, . . . 108-4).

Figure 2:
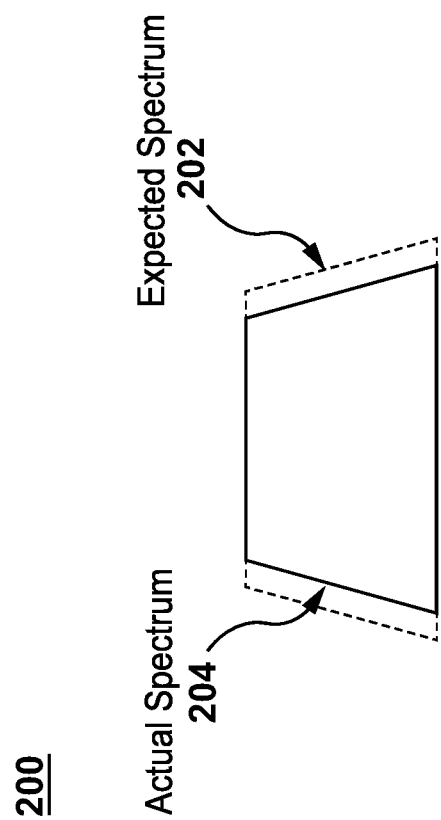
FIG. 2 illustrates a spectrum narrowing due to a faulty wavelength selective switch (WSS)

FIG. 2 illustrates a spectrum narrowing 200 due to a faulty WSS (e.g., one of the WSSs 108-1, 108-2, . . . 108-4). As shown, an expected spectrum at the receiver 110 (of FIG. 1) may be represented by numeral 202. Also, an actual spectrum due to spectrum narrowing at the receiver 110 due to the faulty WSS (e.g., one of the WSSs 108-1, 108-2, . . . 108-4) may be represented by numeral 204. The actual spectrum 204 may still be symmetrical however, the actual spectrum 204 may be narrow as compared to the expected spectrum 202.

Figure 3:
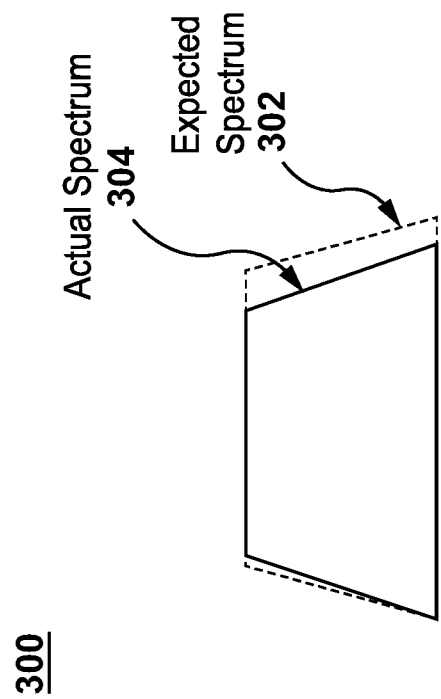
FIG. 3 illustrates an asymmetric filtering due to the faulty WSS.

FIG. 3 illustrates an asymmetric filtering 300 due to the faulty WSS (e.g., one of the WSSs 108-1, 108-2, . . . 108-4). As shown, an expected spectrum at the receiver 110 (of FIG. 1) may be represented by numeral 302. Also, an actual spectrum due to asymmetric filtering at the receiver 110 due to the faulty WSS (e.g., one of the WSSs 108-1, 108-2, . . . 108-4) may be represented by numeral 304. A center wavelength of the expected spectrum 302 may be shifted to left or right resulting in an offset in the expected spectrum 302. The actual spectrum 304 may have an offset as compared to the expected spectrum 302.

Various prior art techniques suggest putting high-resolution optical spectrum analyzers (OSAs) at multiple locations of the DWDM optical link 100, but approach is costly in monetary terms. Few other prior arts techniques are based on machine learning technique. In order to localize a faulty filter, such techniques detect and analyze certain parameters such as received optical power and pre-forward error correction bit error rate during abnormal operation. However, it would be difficult to acquire a large number of data for machine-learning (i.e., training) under abnormal filter operation in practice.

With this said, various non-limiting embodiments of the present disclosure are directed towards localizing the faulty optical filter location by analyzing signal spectrum obtainable at a typical coherent receiver without adding complex subsystems.

Returning to FIG. 1, as a wavelength channel propagates from the transmitter 102 towards the receiver 110, amplified spontaneous emission (ASE) noise from each optical amplifier (e.g., optical amplifiers 104-1, 104-2, . . . 104-7) may be added to the wavelength channel. Also, during the propagation of the wavelength channel over the DWDM link 100, the wavelength channel may pass through one or more WSS (e.g., WSSs 108-1, 108-2, . . . 108-4). In the case that one of the WSSs 108-1, 108-2, . . . 108-4 becomes faulty, the ASE noise accumulated up to a location of the faulty WSS may be filtered out asymmetrically. At the frequencies where the ASE noise is filtered out by the faulty WSS, an additional ASE noise may start to reaccumulate from nearly zero level due to remaining amplifiers after the faulty WSS.

An accumulated noise density at the frequencies where the ASE noise is filtered out by the faulty WSS may be represented as $n_p$. The accumulated noise density $n_p$ may be directly related to the location of the faulty WSS. By way of example, if the faulty WSS (e.g., WSS 108-4) is located at the end of the the DWDM link 100, the accumulated noise density $n_p$ may be close to zero because no additional noise is added after the filtering by the faulty WSS (e.g., WSS 108-4). On the other hand, if the faulty WSS (e.g., WSS 108-1) is located at the beginning of the DWDM link 100 (e.g., right after the transmitter 102), the accumulated noise density $n_p$ may be almost the same level of the end-to-end noise ($n_{E2E}$). The closer the faulty WSS is close to the receiver 110, lesser the accumulated noise density would be and vice versa.

In various non-limiting embodiments, the receiver 110 may determine the accumulated noise density $n_p$ (by various techniques discussed later in the disclosure). Further, the link controller 120 may store the predicted accumulated noise densities $n_p^{link}(i) \forall N$ in a non-transitory memory element, where i denotes an index of the WSSs in the DWDM link 100 and N denotes a total number of the WSSs in the DWDM link 100. The link controller 120 may compare the accumulated noise density $n_p$ with the predicted accumulated noise densities $n_p^{link}(i) \forall N$ to identify the location of faulty WSS.

The predicted accumulated noise densities $n_p^{link}(i) \forall N$ may be defined as the predicted noise from ith WSS (e.g., WSSs 108-1) to the receiver 110. The predicted accumulated noise densities $n_p^{link}(i) \forall N$ may be predicted with given parameters (e.g., WSS location, span loss, amplifier gain, amplifier noise figure, input power to amplifier or the like) of the DWDM link 100. In certain non-limiting embodiments, the predicted accumulated noise densities $n_p^{link}(i) \forall N$ may be predicted dynamically in real-time in response to determination of a fault.

It is to be noted that modern optical networks may have an accessibility to various link parameters (e.g., WSS location, span loss, amplifier gain, amplifier noise figure, input power to amplifier or the like) via an optical real-time monitoring and upper-level control plane implemented by the link controller 120.

By way of example, it may be possible to monitor the input power and optical signal-to-noise ratio (OSNR) of each wavelength channel at multiple location of the DWDM link 100. Also, the information about a topology of the DWDM link 100, bandwidth of the wavelength channel, location of various WSS (e.g., WSSs 108-1, 108-2, . . . 108-4), span loss, gain and noise figure of optical amplifiers (e.g., optical amplifiers 104-1, 104-2, . . . 104-7) or the like may be known to the link controller 120 beforehand. Therefore, once the input power and OSNR at a certain point is known, the predicted accumulated noise density $n_p^{link}(i)$ may be calculated at any arbitrary location.

It is to be noted that it may be less likely that WSSs may be located at every fiber span (or optical amplifiers), a rough noise estimation may be enough to determine a suitable match of the faulty WSS location.

Figure 4:
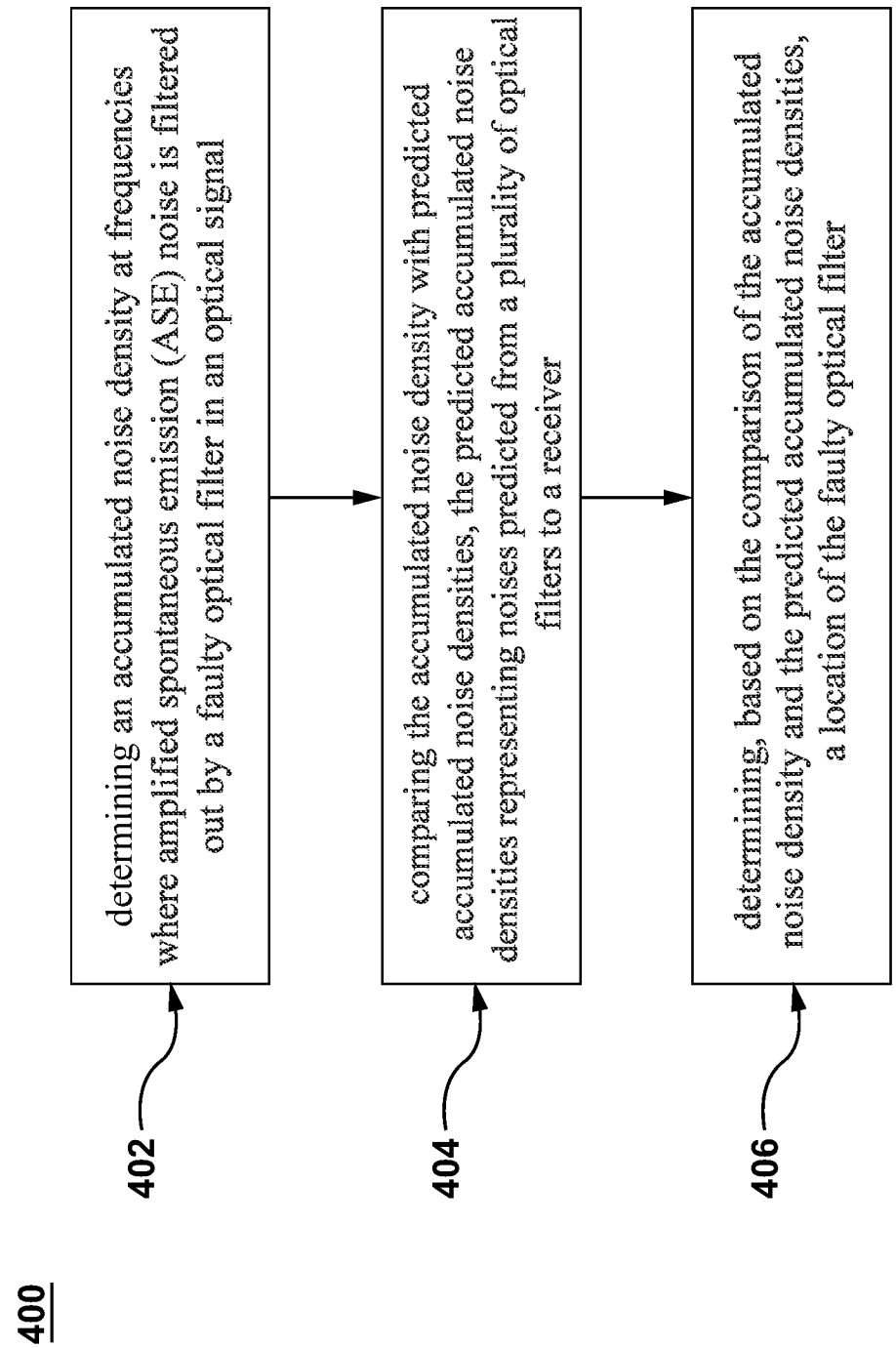
FIG. 4 illustrates a depicts a flowchart of a process representing a method for optical filter fault localization, in accordance with various non-limiting embodiments of the present disclosure.

FIG. 4 illustrates a flowchart of a process 400 representing a method for optical filter fault localization, in accordance with various non-limiting embodiments of the present disclosure. As shown, the process commences at step 402 where the link controller 120 determines an accumulated noise density at the frequencies where the ASE noise is filtered out by the faulty WSS in an optical signal received by the receiver 110.

As previously discussed, an optical signal in the DWDM link 100 may propagate through the WSSs 108-1, 108-2, . . . 108-4 and the optical amplifiers 104-1, 104-2, . . . 104-7. The optical amplifiers 104-1, 104-2, . . . 104-7 may add ASE noise to the optical signal. There may be chances that at least one of the WSSs 108-1, 108-2, . . . 108-4 become faulty. The faulty WSS may result in a spectrum narrowing and/or spectrum shifting of the optical signal propagated through the faulty WSS. In certain non-limiting embodiments, the receiver 110 may determine that a fault has occurred in one of the WSSs 108-1, 108-2, . . . 108-4. The receiver 110 may extract a spectrum of the received optical signal and may determine if there is any asymmetry the extracted spectrum. In response to determination that the extracted spectrum is asymmetrical, the receiver 110 may notify that link controller 120 about the fault.

Figure 5B:
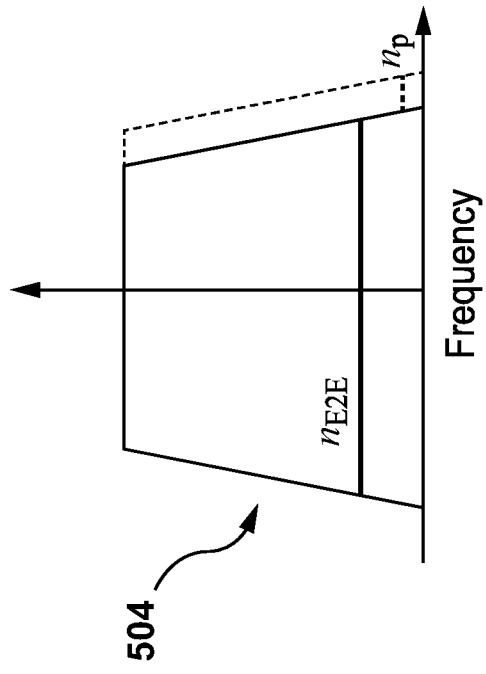
FIGS. 5A and 5B illustrate representative spectrums of an optical signal received by a receiver, in accordance with various non-limiting embodiments of the present disclosure.
Figure 5A:
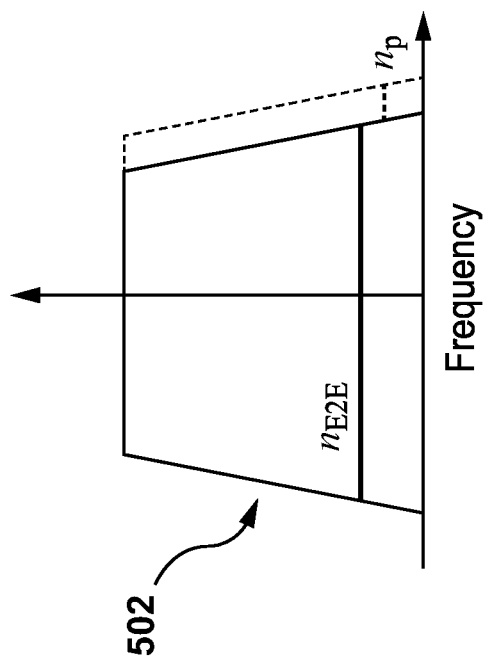

FIGS. 5A and 5B illustrate representative spectra 502 and 504 of the optical signal received by the receiver 110, in accordance with various non-limiting embodiments of the present disclosure. The noise density $n_p$ illustrated in the representative spectrum 502 may represent a noise accumulated at the frequencies where the ASE noise is filtered out by a faulty WSS (e.g., WSS 108-2) far from the receiver 110. The noise density $n_p$ illustrated in the representative spectrum 504 may represent a noise accumulated at the frequencies where the ASE noise is filtered out by a faulty WSS (e.g., WSS 108-3) closer to the receiver 110. The farther the faulty WSS (e.g., WSS 108-2) to the receiver 110, more is the level of the accumulated noise density $n_p$.

In certain non-limiting embodiments, the link controller 120 (as shown in FIG. 1) may determine the accumulated noise density $n_p$. It is to be noted that how the accumulated noise density $n_p$ is determined should not limit the scope of the present disclosure.

Figure 6:
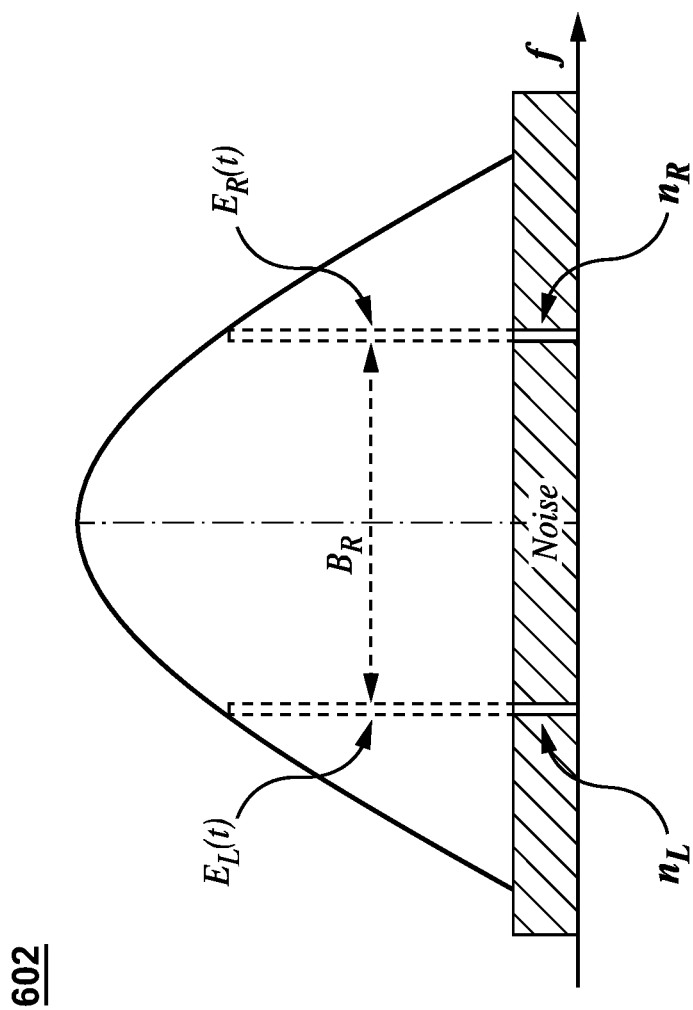
FIG. 6 illustrates a correlation property of a spectrum.

By way of example, FIG. 6 illustrates a correlation property of a spectrum 602. As shown, two signal electric fields $E_L(t)$ and $E_R(t)$ of the spectrum 602 may be separated by baud rate $B_R$ and have almost 100% of correlation due to the clocked signal property. However, the ASE noises $n_L$ and $n_R$ at those spectral locations may be completely uncorrelated. From this property, the correlation value calculated from the electric fields $E_L(t)$ and $E_R(t)$ location may be utilized to determine the accumulated noise density $n_p$. Generally, the correlation becomes lower as accumulated noise density $n_p$ increases.

Figure 7A:
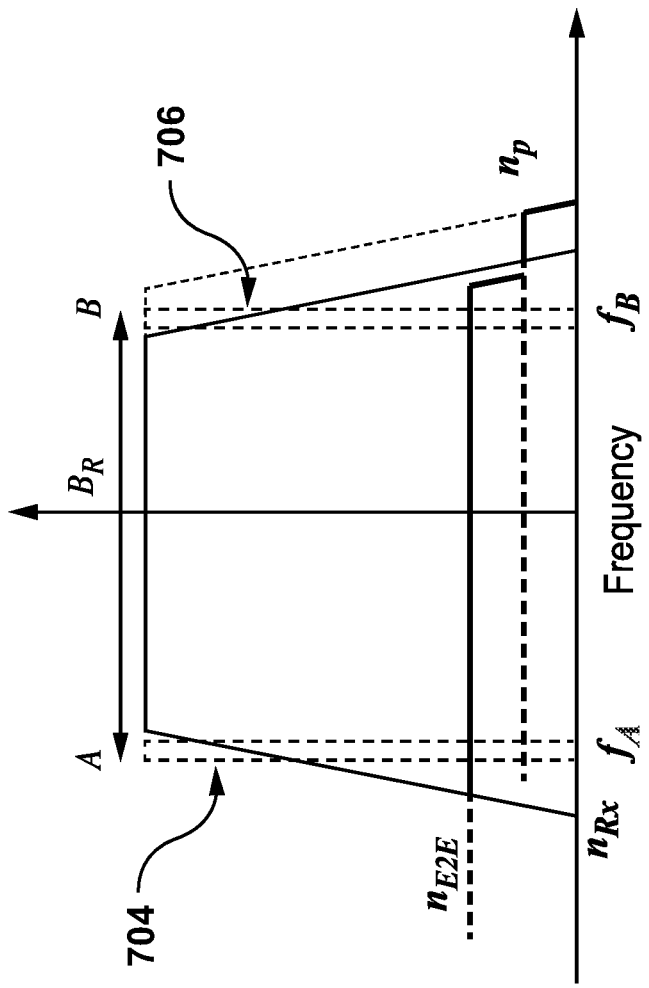
FIGS. 7A and 7B illustrate another representative spectrum of the optical signal received by the receiver, in accordance with various non-limiting embodiments of the present disclosure.
Figure 7B:
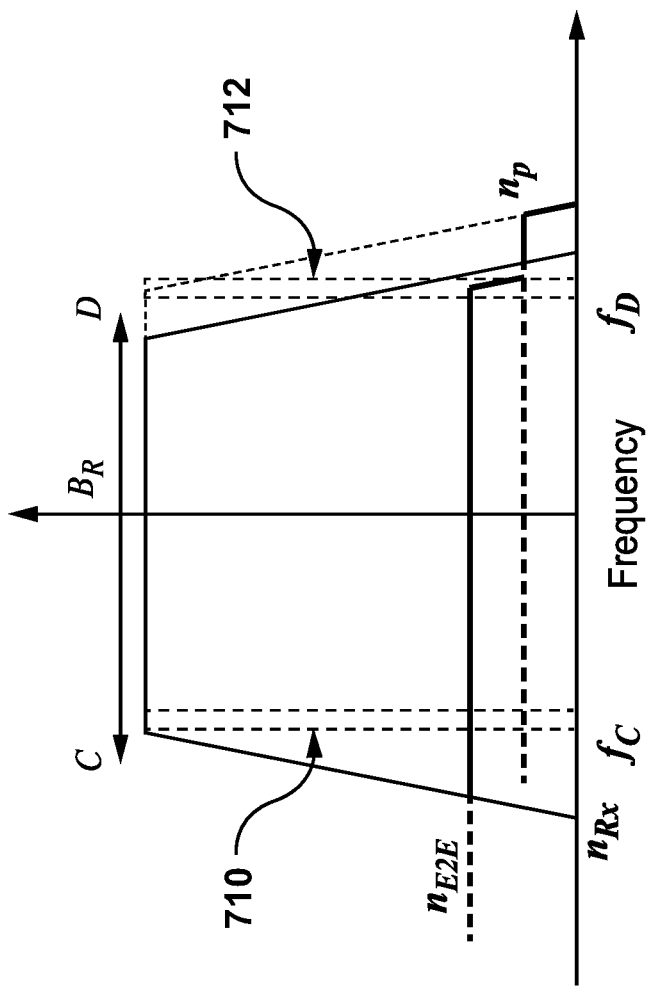

FIGS. 7A and 7B illustrate a representative spectrum 702 of the optical signal received by the receiver 110, in accordance with various non-limiting embodiments of the present disclosure. To determine an accumulated noise density $n_p$, the link controller 120 may select two spectral slices 704 and 706. In certain non-limiting embodiments, the two spectral slices 704 and 706 may be separated by the baud rate. It is to be noted that the two spectral slices 704 and 706 may be chosen to have frequency offset such that so that the two spectral slices 704 and 706 may contain noise power of $n_{E2E}$.

In certain non-limiting embodiments, the link controller 120 may determine $n_{E2E}$ by applying correlation with a negative offset or positive offset depending on how the spectrum 702 has been offset, assuming $n_{Rx}$ (noise density received by the receiver 110) is relatively flat.

Assuming $E_{sig}(f_B, t)=\sqrt{C(f_A)}E_{sig}(f_A, t)$, where $E_{sig}(f_B, t)$ may be an electric field at the spectral slice 706 having a frequency $f_B$, $E_{sig}(f_A, t)$ may be an electric field at the spectral slice 704 having a frequency $f_A$ and $C(f_A)$ may be the signal power ratio of the spectral slice 706 having a frequency $f_B$ to the spectral slice 704 having a frequency $f_A$. The correlation between two spectral slices 704 and 706 may be given by:

$$\text{Corr}=\sqrt{C(f_A)}\langle |E_{sig}(f_A, t)|^2 \rangle =\sqrt{C(f_A)}S(f_A) \quad (1)$$

Where, $S(f_A)$ is the signal power of the spectral slice 704 having a frequency $f_A$.

Let $K_1=\sqrt{C(f_A)}S(f_A)$, $K_2=S(f_A)+n_{Rx}(f_A)$, and $K_3=C(f_A)S(f_A)+n_{Rx}(f_B)$, where $n_{Rx}(f_A)$ and $n_{Rx}(f_B)$ may be noise received by the receiver 110 at frequencies $f_A$ and $f_B$.

As previously discussed, that the $n_{Rx}$ may be relatively flat, to this end, $n_{Rx}(f_A)$ may be approximately equal to $n_{Rx}(f_B)$. In certain non-limiting embodiments, the $n_{Rx}$ at any frequency $f$ may be derived from $K_1$, $K_2$, and $K_3$. At $f=f_A$, $n_{E2E}$ may be approximately equal to $n_{Rx}(f_A)$.

After determining the $n_{E2E}$, the link controller 120 may select two spectral slices 710 and 712 without offset (i.e., symmetric w.r.t. center frequency). Based on the $n_{E2E}$, the link controller 120 may determine the accumulated noise density $n_p$ by applying a similar correlation.

Let $K_4=\sqrt{C(f_c)}S(f_c)$, $K_5=S(f_c)+n_{Rx}(f_c)$, and $K_6=C(f_c)S(f_c)+C(f_c)n_{Rx}(f_c)+(1-C(f_c))n_p$, $n_p$ may be derived from $K_4$, $K_5$, and $K_6$.

In another embodiment, the link controller 120 may rely on a recovered optical signal waveform after a forward error correction (FEC). The optical signal from the transmitter 102 without any filtering effect may be recovered at receiver 110. The recovered signal may be referred to as a signal without noise. Since the recovered optical signal may have the electric field, so the correlation between the received optical signal and the recovered optical signal may result in the portion of $n_p$ at targeted spectral location. The ASE noise distribution at an arbitrary spectral location may be obtained by repeating the correlation for all the frequencies of the received and the recovered signal.

Figure 8:
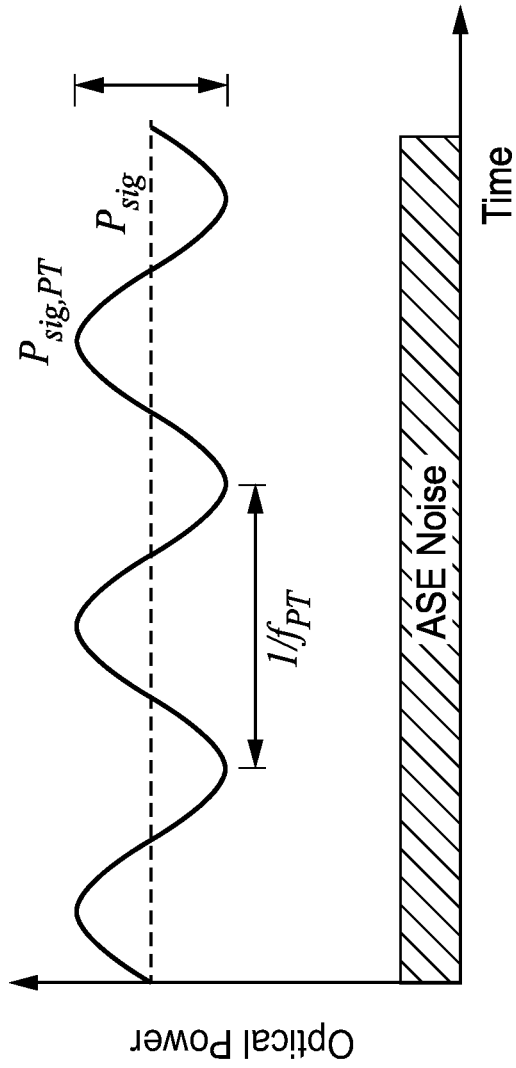
FIG. 8 illustrates an example of the received optical signal modulated by the pilot tone and having the ASE noise, in accordance with various non-limiting embodiments of the present disclosure

In another embodiment, the link controller 120 may determine the accumulated noise density $n_p$ based on a pilot tone signal. In certain non-limiting embodiments, the transmitter 102 (as shown in FIG. 1) may modulate the optical signal with a pilot tone. The pilot tone may be a low frequency signal, typically less than a few Mhz. FIG. 8 illustrates an example 802 of the received optical signal modulated by the pilot tone and having the ASE noise, in accordance with various non-limiting embodiments of the present disclosure. An example of optical signal modulated with the pilot tone may be expressed as:

$$P_{sig,PT}(t)=P_{sig}(t)(1+m\cos(2\pi f_{PT}t)) \quad (2)$$

Where $P_{sig,PT}(t)$, is a power of the optical signal modulated with the pilot tone, $P_{sig}(t)$ is a power of the optical signal, m is a modulation depth, and $f_{PT}$: pilot tone frequency. It is to be noted that an amplitude of the pilot tone signal may depend on signal power, $P_{sig}(t)$, but not on the ASE noise.

In order to compute the accumulated noise density $n_p$, the link controller 120 may determine a root mean square value to compute a total power of the received optical signal. In certain non-limiting embodiments, the received optical signal may have a complex optical electrical field. The link controller 120 may determine a pure signal power of the received optical signal by detecting the pilot tone power.

Based on the total power and the pure power of the received optical signal, the link controller 120 may determine the power of ASE noise. By way of example, the power of ASE noise over 0.1 nm bandwidth may be represented as:

$$P_{ASE,0.1nm} = \left[\left(\frac{1}{R} - \frac{1}{m}\right)P_{PT} - P_{imp}\right]\frac{BW_{0.1nm}}{BW_{sig}} \quad (3)$$

Where, $$R = \frac{P_{PT}}{P_{sig} + (P_{ASE} + P_{imp})},$$

$P_{PT}$ is the power of the pilot tone, $BW_{0.1\ nm}$ is the 0.1 nm bandwidth and $BW_{sig}$ is the optical signal bandwidth and $P_{imp}$ is the implementation noise of the system other than ASE.

In certain non-limiting embodiments, the link controller 120 may select a spectral slice at a desired location (at the frequencies where the ASE noise is filtered out by the faulty WSS) to obtain the accumulated noise density $n_p$.

It is to be noted that how the accumulated noise density $n_p$ is computed should not limit the scope of the present disclosure.

Returning to FIG. 4, the process 400 advances to step 404 where the link controller 120 compares the accumulated noise density $n_p$ with the predicted accumulated noise densities $n_p^{link}(i) \forall N$. In various non-limiting embodiments, the predicted accumulated noise densities $n_p^{link}(i) \forall N$ may be predetermined. In some embodiments, the predicted accumulated noise densities $n_p^{link}(i) \forall N$ along with the associated locations of the WSSs (e.g., WSSs 108-1, 108-2, . . . 108-4) may be stored in a memory associated with the link controller 120.

Figure 9:
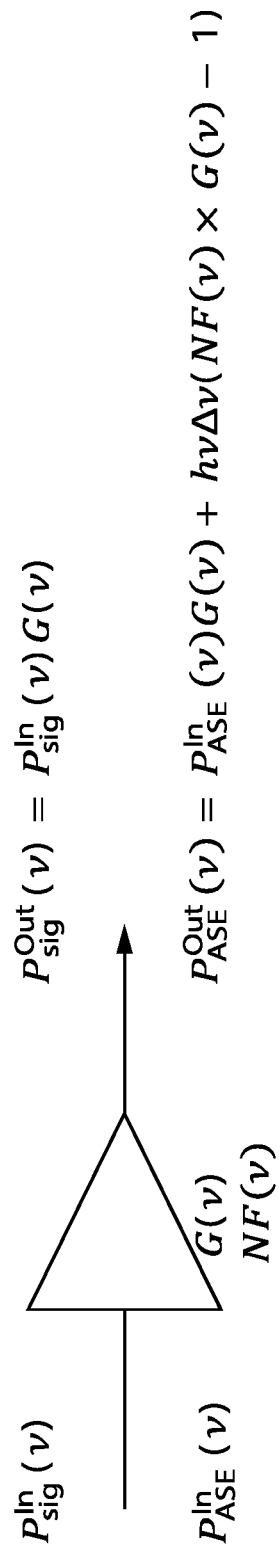
FIG. 9 illustrates an optical amplifier, in accordance with various non-limiting embodiments of the present disclosure.

As previously noted, the link controller 120 may have access to the various link parameters (e.g., WSS location, span loss, amplifier gain, amplifier noise figure, input power to amplifier or the like). FIG. 9 illustrates the optical amplifier 104-1, in accordance with various non-limiting embodiments of the present disclosure. In certain non-limiting embodiments, the link controller 120 may be aware about a gain $G(v)$ and noise figure $NF(v)$ at frequency $v$ for each optical amplifier (e.g., optical amplifiers 104-1, 104-2, . . . 104-7).

For frequency bandwidth $\Delta v$, an output signal power $P_{sig}^{Out}$ and an output ASE noise power $P_{ASE}^{Out}$ for each optical amplifier (e.g., optical amplifiers 104-1, 104-2, . . . 104-7) may be related to respective input signal power $P_{sig}^{In}(v)$ and input ASE noise power $P_{ASE}^{In}$ by the following equations (h is Planck constant):

$$P_{ASE}^{Out}(v) = P_{sig}^{Om}(v) G(v) \quad (4)$$

$$P_{ASE}^{OUT}(v) = P_{ASE}^{In}(v) G(v) + h v \Delta v (NF(v) \times G(v) - 1) \quad (5)$$

A normalized noise (ASE noise-to-signal ratio in equal bandwidth) may be given by:

$$n_{ASE}^{Out}(v) = n_{ASE}^{In}(v) + \frac{h v \Delta v (NF(v) \times G(v) - 1)}{P_{sig}^{In}(v) G(v)} \quad (6)$$

The input signal power $P_{ASE}^{In}(v)$ in bandwidth $\Delta v$, may be related to input signal spectral density $\rho_{sig}^{IN}(v)$ as:

$$P_{sig}^{In}(v) = \rho_{sig}^{In}(v) \Delta v \quad (7)$$

Therefore, normalized noise (ASE noise-to-signal ratio in equal bandwidth) may be given by:

$$n_{ASE}^{Out}(v) = n_{ASE}^{In}(v) + \frac{h v (NF(v) \times G(v) - 1)}{\rho_{sig}^{In}(v) G(v)} \quad (8)$$

Therefore, by retrieving the amplifier gains, noise figures, and input power densities of each optical amplifier (e.g., optical amplifiers 104-1, 104-2, . . . 104-7) from the DWDM link 100, the link controller 102 may predict the accumulated noise densities $n_p^{link}(i) \forall N$ from various WSSs (e.g., WSSs 108-1, 108-2, . . . 108-4) to receiver 110. By way of example, the link controller 102 may predict an accumulated noise density $n_p^{link}(1)$ representing ASE noises accumulated due to optical amplifiers 104-1, 104-2, . . . 104-7 (located after the WSS 108-1) to the receiver 110. The link controller 102 may dynamically calculate and store the predicted accumulated noise density $n_p^{link}(1)$ along with a location of the WSS 108-1.

In a similar manner, the link controller 102 may predict an accumulated noise density $n_p^{link}(2)$ representing ASE noises accumulated due to optical amplifiers 104-2, . . . 104-7 (located after the WSS 108-2) to the receiver 110. The link controller 102 may store the predicted accumulated noise density $n_p^{link}(2)$ along with a location of the WSS 108-2. It is to be noted that the link controller 100 may predict the accumulated noise densities $n_p^{link}(i) \forall N$ after each WSS (e.g., WSSs 108-1, 108-2, . . . 108-4) and may store the associated location of each WSS (e.g., WSSs 108-1, 108-2, . . . 108-4).

Retuning to FIG. 4, the process 400 advances to step 406, where the link controller 102 determines a location of a faulty WSS in the DWDM link 100. The determination of the location of the faulty WSS is based on a comparison of the accumulated noise density $n_p$ with the predicted accumulated noise densities $n_p^{link}(i) \forall N$. In case, the accumulated noise density $n_p$ is closer to one of the predicted accumulated noise densities $n_p^{link}(i) \forall N$ (for example 80% or 90% closer), the link controller 120 may determine the location the corresponding WSS representing the faulty WSS (e.g., WSSs 108-1, 108-2, . . . 108-4).

In certain non-limiting examples, after determining the location of the faulty WSS, the link controller 120, may re-route an optical signal transmission path to circumvent the faulty WSS.

Thus, by virtue of the techniques presented in the present disclosure, the location of the faulty WSS may be determined without any additional dedicated hardware such as high resolution OSAs.

Figure 10:
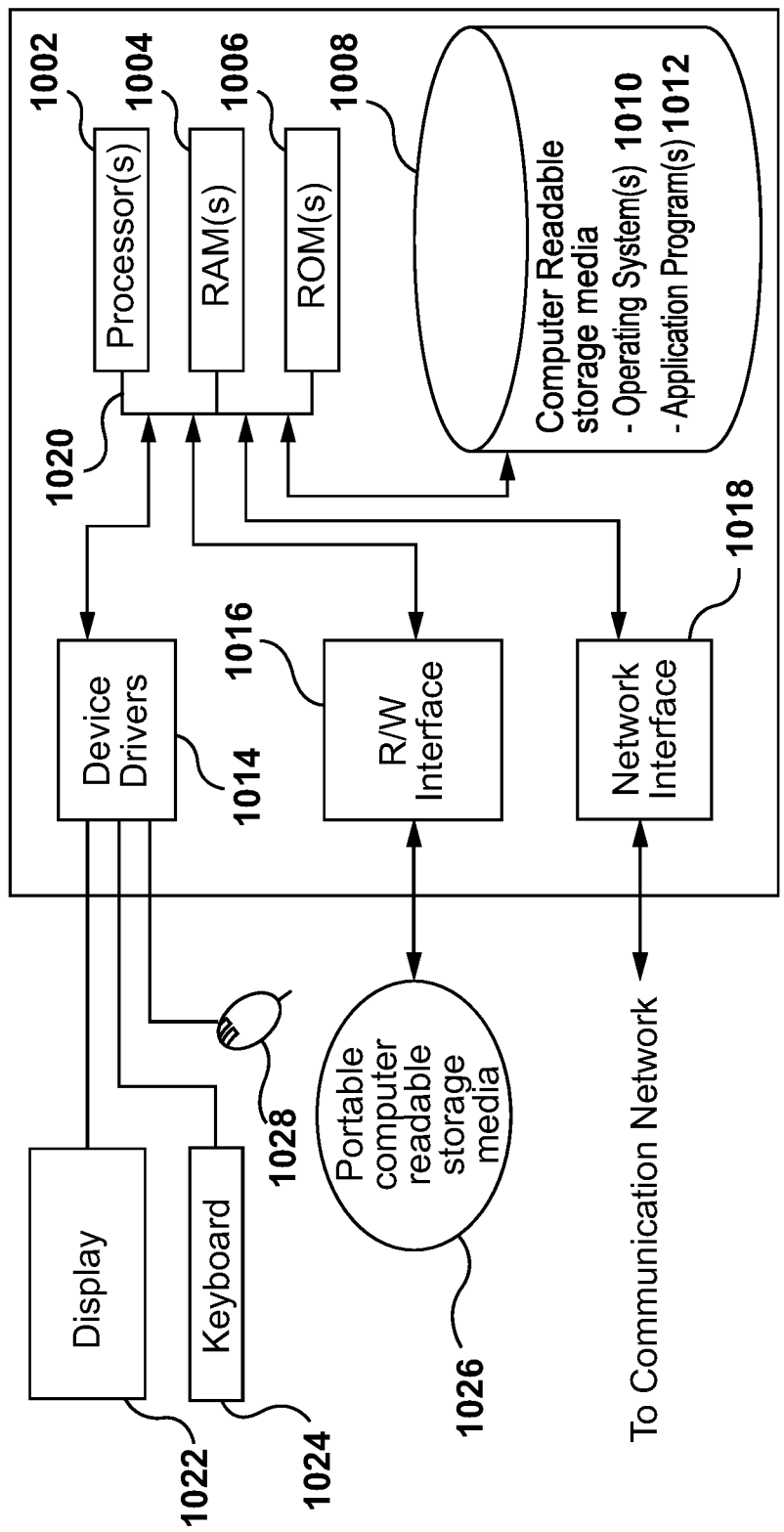
FIG. 10 depicts a high-level block diagram of components of the link controller, in accordance with various embodiments of the present disclosure.

FIG. 10 depicts a high-level block diagram of components of the link controller 120, in accordance with various embodiments of the present disclosure. It should be appreciated that FIG. 10 provides only an illustration of one implementation of the link controller 120 and does not imply any limitations with regard to the environments in which different embodiments may be implemented. Various modifications to the depicted environment may be done to implement the link controller 120 without departing from the principles presented herein. The link controller 120 may be a server, a desktop computer, a laptop computer, or any device that may be configured to implement the present technology, as should be understood by a person skilled in the art.

As shown, the link controller 120 employs one or more different type of processors 1002, one or more computer-readable random access memories (RAMs) 1004, one or more computer-readable read only memories (ROMs) 1006, one or more computer-readable storage media 1008, device drivers 1014, a read/write (R/W) driver interface 1016, a network interface 1018, all interconnected over a communication fabric 1020. The communication fabric 1020 may be implemented by any architecture designed for communicating data and/or control information between processors (such as microprocessors, communications and network processors, etc.), system memory, peripheral devices, and any other hardware components within a system.

The processor 1002 of the link controller 120 may include one or more of a CPU, an accelerator, a microprocessor, a GPU, an NPU, an ASIC, a FPGA, a dedicated logic circuitry, a dedicated artificial intelligence processor unit, or combinations thereof. It is to be noted that in certain non-limiting embodiments, at least one of the processors 1002 may be associated with the receiver 110 to perform various functionalities. Where the processor 1002 is located in the DWDM optical link 100 should not limit the scope of present disclosure.

One or more operating systems 1010 and one or more application programs 1012 (examples of application programs may include programming instructions) are stored on one or more of computer-readable storage media 1008 for execution by one or more of the processors 1002 via one or more of respective RAMs 204 (which typically include a cache memory). In the illustrated embodiment, each of the computer-readable storage media 1008 maybe embodied as a magnetic disc storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The R/W driver interface 1016 reads from and writes to one or more portable computer-readable storage media 1026. The application programs 1012 may be related to the intelligent heterogeneous computing system and stored on one or more portable computer-readable storage media 1026, read via the respective R/W driver interface 1016 and loaded into the respective computer-readable storage media 1008.

Further, network interface 1018 may be based on a TCP/IP adapter card or wireless communication adapter (such as a wireless communication adapter using OFDMA technology). The application programs 1012 on the link controller 120 may be downloaded to the link controller 120 from an external computer or external storage device via a communication network (for example, the Internet, a local area network or other wide area network or wireless network) and network interface 1018. From network interface 1018, application programs 1012 may be loaded onto the computer-readable storage media 1008. The link controller 120 may connect to routers, firewalls, switches, gateway computers and/or edge servers of the communication network using copper wires, optical fibers, wireless transmission, and the like.

The link controller 120 may also include a display screen 1022, a keyboard or keypad 1024, and a computer mouse or touchpad 1028. The device drivers 1014 may interface with display screen 1022 for imaging, with the keyboard or the keypad 1024, with computer mouse or touchpad 1028, and/or with display screen 1022 (which may be a touch sensitive display) for alphanumeric character entry and user selections. The device drivers 1014, R/W driver interface 1016 and network interface 1018 may comprise hardware and software (stored on the computer-readable storage media 1008 and/or the ROM 1006).

It is to be understood that the operations and functionality of the link controller 120, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method for optical filter fault localization comprising:
   determining an accumulated noise density at frequencies where amplified spontaneous emission (ASE) noise is filtered out by a faulty optical filter in an optical signal;
   comparing the accumulated noise density with predicted accumulated noise densities, the predicted accumulated noise densities representing noises predicted from a plurality of optical filters to a receiver; and
   determining, based on the comparison of the accumulated noise density and the predicted accumulated noise densities, a location of the faulty optical filter.

2. The method of claim 1, wherein the predicted accumulated noise densities from the plurality of optical filters to the receiver along with locations of the plurality of optical filters are stored in a non-transitory memory element.

3. The method of claim 1, wherein the predicted accumulated noise densities are predetermined based on link parameters on a path between a transmitter and the receiver over which the optical signal is propagating.

4. The method of claim 1, wherein the predicted accumulated noise densities are predetermined from each optical filter of the plurality of optical filters to the receiver, each optical filter being located on a path between a transmitter and the receiver over which the optical signal is propagating.

5. The method of claim 1, further comprising determining a location of a given optical filter in response to the accumulated noise density being approximately equal to a predicted accumulated noise density corresponding to the given optical filter.

6. The method of claim 1, further comprising determining that a given optical filter of the plurality of optical filters is the faulty optical filter in response to the accumulated noise density being approximately equal to the predicted accumulated noise density corresponding to the given optical filter.

7. The method of claim 1, wherein the accumulated noise density is determined based on a pilot tone signal inserted in the optical signal.

8. The method of claim 1, wherein the accumulated noise density is determined based on a correlation between a recovered optical signal and the optical signal.

9. The method of claim 1, wherein the accumulated noise density is determined based on a correlation between at least two spectral slices spaced apart by a distance equal to a baud rate.

10. A system for optical filter fault localization comprising:
    a non-transitory memory element having instructions thereon;
    a processor coupled to the non-transitory memory element and configured to execute the instructions to cause the processor to:
       determine an accumulated noise density at frequencies where amplified spontaneous emission (ASE) noise is filtered out by a faulty optical filter in an optical signal;
       compare the accumulated noise density with predicted accumulated noise densities, the predicted accumulated noise densities representing noises predicted from a plurality of optical filters to a receiver; and
       determine, based on the comparison of the accumulated noise density and the predicted accumulated noise densities, a location of the faulty optical filter.

11. The system of claim 10, wherein the predicted accumulated noise densities from the plurality of optical filters to the receiver along with locations of the plurality of optical filters are stored in the non-transitory memory element.

12. The system of claim 10, wherein the predicted accumulated noise densities are predetermined based on link parameters on a path between a transmitter and the receiver over which the optical signal is propagating.

13. The system of claim 10, wherein the predicted accumulated noise densities are predetermined from each optical filter of the plurality of optical filters to the receiver, each optical filter being located on a path between a transmitter and the receiver over which the optical signal is propagating.

14. The system of claim 10, wherein the processor is further configured to determine a location of a given optical filter in response to the accumulated noise density being approximately equal to a predicted accumulated noise density corresponding to the given optical filter.

15. The system of claim 10, wherein the processor is further configured to determine that a given optical filter of the plurality of optical filters is the faulty optical filter in response to the accumulated noise density being approximately equal to the predicted accumulated noise density corresponding to the given optical filter.

16. The system of claim 10, wherein the accumulated noise density is determined based on a pilot tone signal inserted in the optical signal.

17. The system of claim 10, wherein the accumulated noise density is determined based on a correlation between a recovered optical signal and the optical signal.

18. The system of claim 10, wherein the accumulated noise density is determined based on a correlation between at least two spectral slices spaced apart by a distance equal to a baud rate.

* * * * *